JOHN McDOWELL, OF BUFFALO TOWNSHIP, PENNSYLVANIA.

Letters Patent No. 88,973, dated April 13, 1869.

IMPROVED SALVE FOR CURE OF FOOT-ROT IN SHEEP.

The Schedule referred to in these Letters Patent and making part of the same.

*To all whom it may concern:*

Be it known that I, JOHN McDOWELL, of Buffalo township, in the county of Washington, and in the State of Pennsylvania, have invented an Ointment or Salve for the Cure of Foot-Rot in Sheep; and do hereby declare that the following is a full, clear, and exact description thereof, reference being had to the within description of the new compound of which my invention is composed.

To enable others skilled in the art to make and use my invention, I will proceed to describe the nature of my compound, and how it is applied, and the purposes for which it is designed.

The object of my invention is for curing and preventing what is known as "foot-rot in sheep," a disease which is very prevalent among and destructive to sheep. I have found by various experiments, on various flocks and in various places, and at different times, the following compound is a safe and sure preventive and cure for said disease, and is made into a salve or ointment, which is readily and easily applied to the feet of the sheep without regard to where they are feeding.

The following are the different articles with the proportion of each article, and of the compound prepared as an ointment:

First, *Plumbi carbonas,* (or white-lead,) ground in oil, one pound; second, *Zinci carbonas impurum,* (or calamine powder,) four ounces; third, *Antimonium terchloridi,* (or butter of antimony,) two ounces. The whole is ground together with oil into a regular salve or ointment, which ointment can be put in boxes and sold in sizes required, from one-fourth of a pound to a pound or more, as parties may require.

In the application of my compound salve or ointment, I take the sheep and carefully pare the hoof and clean it of all extraneous matter, and then carefully fill in between the toes with my ointment, carefully working the toes back and forward until the cloven aperture is well filled, and it may be still further pressed in by means of a small instrument like a trowel, so that the ointment will remain in the foot between the toes. The effect of the ointment is generally seen on the diseased foot while yet being operated on, for I have found that while the foot is being operated on, the ointment acts on the virus in the foot, and a chemical action is plainly visible. When thus acted on the sheep is set at liberty, and need not be confined to any particular locality or any change of pasture, and the ointment may be applied at any season of the year. It may, in extreme cases, be found necessary to make a second application when a cure is always sure; but in most of cases one application is all sufficient.

As the disease, when of long standing, will more or less affect the health of the sheep, I find it greatly to aid in curing the disease of the foot, and to restore the general health of the animal to give some general course of treatment. For this purpose I use as a feed, placed in a trough, a small quantity of bran, salt, and sulphur, which they freely partake of. I usually erect a platform in front of the trough on which I scatter air-slaked lime, which will aid in keeping the ointment in the foot. The platform and trough I usually make in length according to the number of sheep to be taken care of. The disease of "sheep-rot" is one well known to sheep-raisers; that it is very destructive to sheep, and many efforts have been made to effect a cure, and to prevent the disease.

These desirable objects I have accomplished by my invention and treatment of sheep for this wasting disease. I have treated this disease in hundreds of cases with entire success.

What I claim as my invention, is—

The ointment, or salve compound, as herein described, and for the purposes set forth.

In testimony that I claim the above-described ointment or salve for the cure of foot-rot in sheep, I have hereunto signed my name, this 23d day of March, 1868.

JOHN McDOWELL.

Witnesses:
 A. MURDOCH,
 R. DOUGAN.